US00RE46517E

(19) United States
(12) Reissued Patent
Yokozawa et al.

(10) Patent Number: US RE46,517 E
(45) Date of Reissued Patent: Aug. 22, 2017

(54) INKJET RECORDING APPARATUS AND METHOD FOR RECORDING AN IMAGE

(71) Applicant: CANON KABUSHIKI KAISHA, Tokyo (JP)

(72) Inventors: Taku Yokozawa, Yokohama (JP); Nobumori Shimizu, Komae (JP)

(73) Assignee: Canon Kabushiki Kaisha, Tokyo (JP)

(21) Appl. No.: 13/967,051

(22) Filed: Aug. 14, 2013

Related U.S. Patent Documents

Reissue of:
(64) Patent No.: 7,997,678
Issued: Aug. 16, 2011
Appl. No.: 11/693,607
Filed: Mar. 29, 2007

(30) Foreign Application Priority Data

Mar. 30, 2006 (JP) ..... 2006-094558
Mar. 2, 2007 (JP) ..... 2007-053055

(51) Int. Cl.
*B41J 29/393* (2006.01)
*B41J 2/165* (2006.01)

(52) U.S. Cl.
CPC ..... *B41J 2/165* (2013.01)

(58) Field of Classification Search
CPC ..... B41J 2/165
USPC ..... 347/1–19, 22, 23
IPC ..... B41J 2/165,2/2142
See application file for complete search history.

(56) References Cited

U.S. PATENT DOCUMENTS

| | | | | |
|---|---|---|---|---|
| 5,565,898 | A * | 10/1996 | Sakuma | 347/23 |
| 5,627,571 | A * | 5/1997 | Anderson et al. | 347/19 |
| 6,203,140 | B1 * | 3/2001 | Oyen | 347/41 |
| 6,224,183 | B1 | 5/2001 | Kono | |
| 6,357,849 | B2 * | 3/2002 | Takizawa et al. | 347/19 |
| 6,585,346 | B2 * | 7/2003 | Endo | 347/19 |
| 6,659,580 | B2 | 12/2003 | Horikoshi | |
| 6,814,422 | B2 * | 11/2004 | Bruch et al. | 347/23 |
| 2003/0030690 | A1 * | 2/2003 | Vega et al. | 347/22 |

* cited by examiner

*Primary Examiner* — Minh T Nguyen
(74) *Attorney, Agent, or Firm* — Canon U.S.A., Inc. IP Division

(57) ABSTRACT

A method and recording apparatus including discharging ink to record an image, storing a parameter relating to a cumulative recording amount of the recording apparatus, setting a detection interval based on the parameter relating to the cumulative recording amount, and detecting a discharge state of the ink discharged from the recording head based on the set interval.

43 Claims, 14 Drawing Sheets

FIG. 8

| | | CUMULATIVE NUMBER OF DISCHARGES ($\times 10^n$) | | | | | | | | | | | | | | | | TOTAL NUMBER OF TIMES |
|---|---|---|---|---|---|---|---|---|---|---|---|---|---|---|---|---|---|---|
| | | 0.5 | 1 | 1.5 | 2 | 2.5 | 3 | 3.5 | 4 | 4.5 | 5 | 5.5 | 6 | 6.5 | 7 | 7.5 | 8 | |
| DEFECTIVE DISCHARGE DETECTION FREQUENCY($\times 10^n$) | PRIOR ART | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 80 TIMES |
| | EMBODIMENT | 0.5 | 0.5 | 0.5 | 0.5 | 0.5 | 0.5 | 0.5 | 0.3 | 0.3 | 0.3 | 0.3 | 0.1 | 0.1 | 0.1 | 0.1 | 0.1 | 34 TIMES |

FIG. 11

| | | CUMULATIVE NUMBER OF DISCHARGES ($\times 10^n$) | | | | | | | | | | | | | | | | TOTAL NUMBER OF TIMES | PROCESSING TIME | |
|---|---|---|---|---|---|---|---|---|---|---|---|---|---|---|---|---|---|---|---|---|
| | | 0.5 | 1 | 1.5 | 2 | 2.5 | 3 | 3.5 | 4 | 4.5 | 5 | 5.5 | 6 | 6.5 | 7 | 7.5 | 8 | | | |
| DEFECTIVE DISCHARGE DETECTION FREQUENCY ($\times 10^n$) | PRIOR ART | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 80 TIMES | 320 MIN. | |
| | EMBODIMENT (BK) | 0.5 | 0.5 | 0.5 | 0.5 | 0.5 | 0.5 | 0.5 | 0.3 | 0.3 | 0.3 | 0.3 | 0.1 | 0.1 | 0.1 | 0.1 | 0.1 | 34 TIMES | 34 MIN. | 97 MIN. |
| | (C) | 0.5 | 0.5 | 0.5 | 0.5 | 0.5 | 0.5 | 0.5 | 0.3 | 0.3 | 0.3 | 0.3 | 0.3 | 0.3 | 0.3 | 0.3 | 0.3 | 21 TIMES | 21 MIN. | |
| | (M) | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 16 TIMES | 16 MIN. | |
| | (Y) | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 26 TIMES | 26 MIN. | |

FIG. 14

| | CUMULATIVE NUMBER OF DISCHARGES ($\times 10^n$) | | | | | | | | | |
|---|---|---|---|---|---|---|---|---|---|---|
| | 0 | 0.5 | 1 | 1.5 | 2 | 2.5 | 3 | 3.5 | 4 | 4.5 |
| DEFECTIVE DISCHARGE DETECTION FREQUENCY ($\times 10^n$) | 0.5 | 0.3 | 0.3 | 0.3 | 0.3 | 0.1 | 0.1 | 0.1 | 0.1 | 0.1 |

INKJET RECORDING APPARATUS AND METHOD FOR RECORDING AN IMAGE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to an inkjet recording apparatus including a recording head configured to discharge an ink to record an image on a recording medium.

2. Description of the Related Art

The recording apparatus, such as printers, copying machines, and facsimile machines, or output devices for computers, word processors, and work stations have the capability of recording an image (including letters and symbols) on a sheet based on image information.

Furthermore, the recording apparatus can record an image on a plastic film (e.g., OHP sheet) or other recording medium. An exemplary recording unit for a recording apparatus is an inkjet type, a wire-dot type, a heat-sensitive type, a heat-transfer type, or a laser beam type.

A serial type recording apparatus includes a carriage performing a main scanning operation in a direction perpendicular to a carrying direction (sub scanning direction) of a recording medium. When a user sets a recording medium on a predetermined recording position, the recording apparatus starts recording an image using a recording head mounted on the carriage shifting (scanning) in the main scanning direction.

When a recording operation for one row (corresponding to one recording/scanning operation) is completed, the recording apparatus feeds (carries) the recording medium forward by a predetermined amount and starts the next image recording operation. The recording apparatus repeats the above-described recording operation and the carrying operation to record an image in a desired range on the recording medium.

An inkjet-type recording apparatus (printer) includes a recording head capable of discharging small ink droplets from small nozzles to form an image on a recording medium. The recording head includes a heater capable of causing film boiling of a stored ink in a nozzle and generating a pressure for discharging an ink droplet from a discharge port.

The inkjet-type recording apparatus can stably obtain an intended image because there is no intervening member such as an intermediate transfer member for an electro-photographic system. On the other hand, an inkjet system is not free from clogging of a nozzle due to dusts or thickened ink, or open circuit of a heater, or an ink droplet closing a nozzle port. Thus, the inkjet system may cause ink discharge defectiveness.

The ink discharge defectiveness includes a non-discharge state where no ink droplet can be discharged from a nozzle, an insufficient-discharge state where a discharged ink droplet has an insufficient amount, and a deviated-discharge state where an impact position of a discharged ink droplet is deviated.

If an ink droplet is discharged from a recording head having ink discharge defectiveness, the impact position of an ink droplet may offset from a target position on a recording medium. A recorded image may include a white streak or a black streak extending along the scanning direction of a recording head.

As discussed in U.S. Pat. No. 6,224,183, the non-discharge state of ink can be detected by discharging an ink droplet between a light-emitting element and a light-receiving element so that an output signal level of the light-receiving element decreases when the ink droplet passes across the light emitted from the light-emitting element.

A recording apparatus having the aforementioned detection arrangement can promptly perform cleaning processing when any non-discharge state is detected. Thus the recording apparatus can avoid clogging of a nozzle and, as a result, can improve the reliability.

As discussed in U.S. Pat. No. 6,659,580, a recording apparatus having a multipass printing function can complementarily print a high-quality image by using a different nozzle to form (i.e., record) a dot if a nozzle designated to form the dot is in a defective state. Thus, the recording apparatus can suppress reduction in image quality even in a situation where a nozzle cannot recover from a non-discharge state regardless of cleaning processing or other recovery operation.

Furthermore, if an image is complementarily recordable in a situation where a non-discharge nozzle is present, a recording apparatus can reduce the operation frequency and the time for the cleaning processing. The ink consumed for the cleaning processing can be decreased.

However, the aforementioned conventional recording apparatus has the following problems with respect to ink discharge defectiveness.

In an attempt to suppress reduction in the image quality caused by the ink discharge defectiveness, the interval for performing discharge defectiveness detection processing can be set to a relatively short value.

Paper dusts or the like tend to adhere on a discharge port surface. Discharge defectiveness, which may be caused by an open circuit of a heater, occurs at a relatively higher rate in a recording apparatus having been used for a relatively long time. In general, accumulation of paper dusts or the like adhering on a discharge port surface of a recording apparatus increases when the operation time of a recording apparatus becomes longer. Surface abrasion of heaters increases when the total number of ink discharges becomes larger.

Water components contained in ink solvent may evaporate from a discharge port of a nozzle. The water evaporation increases the viscosity of ink in the nozzle and causes clogging. If the discharge operation of ink droplets develops bubbles in an ink passage, the bubbles may disturb the discharge operation and cause discharge defectiveness.

The discharge defectiveness due to an increase in the ink viscosity or generation of bubbles tends to occur at a constant probability throughout the life of a recording apparatus (i.e., without depending on the life of a recording apparatus).

In a conventional recording apparatus, detection of discharge defectiveness is performed at relatively short intervals, so as to detect the discharge defectiveness depending on the operation time of a recording apparatus as well as the discharge defectiveness not depending on the operation time of the recording apparatus.

In other words, the conventional recording apparatus performs a discharge defectiveness detecting operation based on a situation where the discharge defectiveness occurs at a higher probability. Furthermore, generation of the discharge defectiveness greatly varies depending on the composition of ink.

If a recording apparatus forms an image using plural inks, the recording apparatus performs a discharge defectiveness detecting operation at an interval corresponding to an ink having a highest discharge defectiveness generation rate.

Recently some recording heads have become longer in size and include a plurality of nozzles densely arrayed. This structure causes the time for a single discharge defectiveness detecting operation tends to increase correspondingly.

Therefore, if the discharge defectiveness detecting operation is performed at short internals (i.e., with a large margin of safety), the reliability of a recording apparatus can be improved. On the other hand, the recording time increases, and the throughput of the recording apparatus decreases.

Furthermore, the discharge amount of ink consumed in a single discharge defectiveness detecting operation increases if a recording head has a longer size and includes a plurality of nozzles densely arrayed.

SUMMARY OF THE INVENTION

Exemplary embodiments of the present invention are directed to a technique capable of improving the reliability of a recording apparatus while limiting reduction in the throughput.

According to an aspect of the present invention, a recording apparatus includes a recording head configured to discharge ink to record an image, a detection unit configured to detect a discharge state of the ink, a storage unit configured to store a parameter relating to a cumulative recording amount of the recording apparatus, wherein the cumulative recording amount represents the recording of images, and a control unit configured to set an interval for detecting the discharge state of the ink based on the parameter relating to the cumulative recording amount stored and to control the detection unit to detect the discharge state of the ink based on the set interval.

According to another aspect of the present invention, a recording apparatus includes a recording head configured to discharge ink from at least one discharge port to record an image, a detection unit configured to detect a discharge state of the ink, a storage unit configured to store a parameter relating to a cumulative recording amount of the recording apparatus, wherein the cumulative recording amount represents recording of images, and a control unit configured to count and store the cumulative recording amount when the detection unit detects, based on the discharge state of the ink, that a number of discharge ports are defective and the number exceeds a predetermined value, and to control the detection unit to detect the discharge state of the ink based on an interval set based on the parameter relating to the cumulative recording amount.

According to yet another aspect of the present invention, a method for recording an image includes discharging ink from a recording head, detecting a discharge state of the ink, storing into a memory a parameter relating to a cumulative recording amount representing recording of images, setting an interval for detecting the discharge state of the ink based on the parameter relating to the cumulative recording amount, and detecting the discharge state of the ink based on the set interval.

According to still another aspect of the present invention, a method for recording an image includes discharging ink from at least one discharge port of a recording head, detecting a discharge state of the ink, storing into a memory a parameter relating to a cumulative recording amount representing recording of images, counting the cumulative recording amount when a number of defective discharge ports is greater than a predetermined value, and setting an interval for detecting the discharge state of the ink based on the cumulative recording amount.

The exemplary embodiments of the present invention can limit reduction in the image quality which may be caused by the discharge defectiveness and improve the reliability of a recording apparatus while limiting reduction in the throughput.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a table illustrating a relationship between a cumulative number of discharges and defective discharge detection frequency according to the first exemplary embodiment.

FIG. 11 is a table illustrating a relationship between a cumulative number of discharges and a defective discharge detection frequency according to the second exemplary embodiment.

FIG. 14 is a table illustrating a relationship between a cumulative number of discharges and a defective discharge detection frequency according to the third exemplary embodiment.

DETAILED DESCRIPTION OF THE EMBODIMENTS

Figure 1:
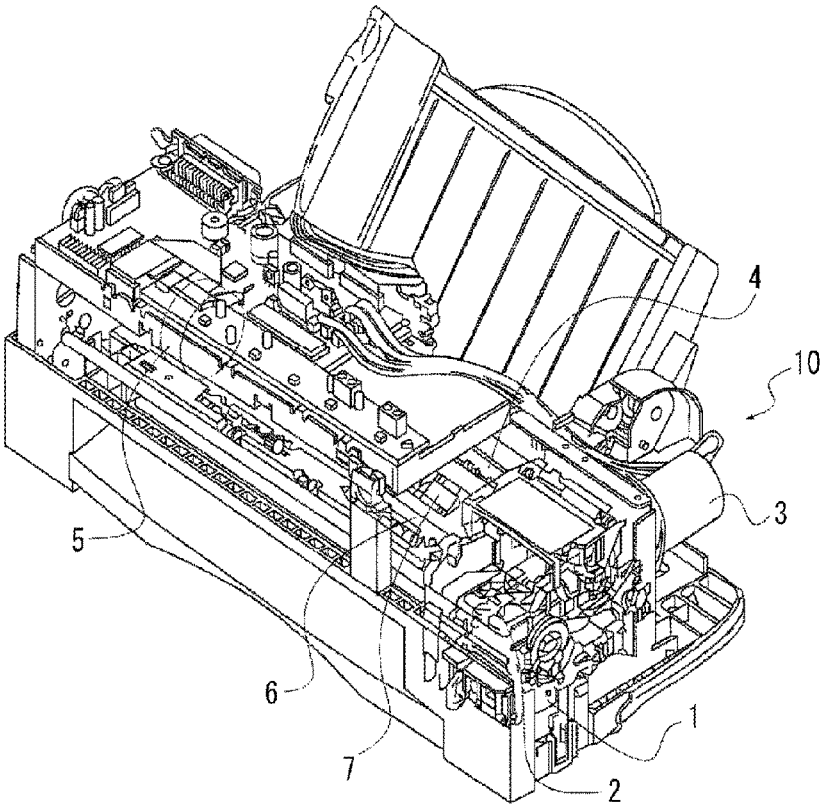
FIG. 1 is a perspective diagram illustrating a recording apparatus according to an exemplary embodiment of the present invention.

The following description of exemplary embodiments is merely illustrative in nature and is in no way intended to limit the invention, its application, or uses.

Processes, techniques, apparatus, and systems as known by one of ordinary skill in the art may not be discussed in detail but are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is described in one figure, it may not be discussed for following figures.

Exemplary embodiments will be described in detail below with reference to the drawings.

In the following description, the "recording", which may be referred to as "printing", includes not only formation of meaningful information (e.g., letters, graphics, etc) but also formation of any meaningless information, and also includes formation of both visible and invisible information. The "recording" includes formation of an image, a design, or a pattern on a recording medium, and includes processing applied to a medium.

Furthermore, the "recording medium" represents a paper used in a general recording apparatus, a cloth, a plastic film, a metallic plate, a glass plate, a ceramic member, a wood plate, a leather sheet, or any other material that can absorb an ink.

Furthermore, the "ink", which may be referred to as "liquid", can be widely interpreted in the same manner as the "recording (printing)". The ink is any liquid capable of forming an image, a design, or a pattern on a recording medium, or applying processing to a recording medium. The liquid for processing the ink (e.g., solidification or insolubilization of a coloring agent contained in an ink) is also included.

Moreover, the "nozzle" is an element capable of generating kinetic energy in a liquid path and discharging an ink from a discharge port.

FIG. 1 is a perspective diagram illustrating an inkjet recording apparatus (hereinafter, referred to as "recording apparatus") 10 according to an exemplary embodiment of the present invention. The recording apparatus 10 illustrated in FIG. 1 is a serial scan type recording apparatus that can form an image by shifting a recording head in a direction (i.e., main scanning direction) perpendicular to a carrying direction (i.e., sub scanning direction) of a recording medium.

An exemplary recording operation of the recording apparatus 10 is described below with reference to FIG. 1. A sheet feeder motor 5 drives a sheet feed roller 6 via gears. The sheet feed roller 6 feeds and carries a recording medium (e.g., a paper). A carriage motor 3 causes the carriage 2 to scan in a direction almost perpendicular to the carrying direction of the recording medium.

A recording head, mounted on the carriage 2, discharges an ink to perform recording (printing) of an image with a constant band width. Subsequently, the sheet feed roller 6 feeds and carries the recording medium by an amount equal to the band width of a recorded image and performs recording (printing) of the next band width.

The recording apparatus 10 can complete the entire recording of a recording medium by repeating a recording/scanning operation performed by the recording head and a sheet feeding/carrying operation performed by the sheet feed roller 6.

In the present embodiment, a carriage belt 4 transmits a driving force from the carriage motor 3 to the carriage 2. The carriage belt 4 can be replaced with a lead screw or any other comparable means capable of forming a driving force transmission mechanism.

A recording medium is fed from a recording medium tray and guided to a clearance between the sheet feed roller 6 and a pressure roller 7, and next carried to a recording section. The recording head, if in an inoperative state, performs no recording operation.

To decrease the amount of ink evaporating from a discharge port of the recording head in the inoperative state, a discharge port surface (i.e., a surface on which the discharge port is formed) of the recording head is covered by a cap (generally referred to as "capping").

The capping brings an effect of shielding a discharge port from ambient air and preventing the discharge port from drying. When a recording apparatus receives a recording instruction together with image data from a host apparatus, a capping motor 1 removes the cap from the discharge port surface so that the recording head can shift along the main scanning direction of the carriage 2.

When a print buffer stores recording data for one recording/scanning operation of the recording head, the carriage motor 3 shifts the carriage 2 to perform a recording operation.

The serial scan type recording apparatus can carry a recording medium by a carrying amount shorter than the recording band width, after the recording head has completed a recording/scanning operation.

More specifically, the recording apparatus can execute a multipass recording operation that performs a plurality of recording/scanning operations by the recording head for accomplishing recording of an image in a region corresponding to a width recordable by one scanning operation of the recording head. Thus, the recording apparatus can suppress color unevenness which may arise when the discharge amounts of respective nozzles are different. As a result, the recording apparatus can form a high-quality image.

In general, to form an image based on a multipass recording operation, a recording head is required to repeat the recording/scanning operation n times in a region corresponding to a width recordable by one scanning operation of the recording head. When each recording/scanning operation is finished, a recording medium is carried by an amount equivalent to 1/n band width.

In the recording/scanning operation repeatedly performed to form an image, the recording apparatus can use a mask to obtain, from the image data, recording data for each recording/scanning operation.

The multipass recording operation can be modified. If needed, the operation frequency of the recording medium carrying processing can be reduced compared to the operation frequency of the recording/scanning processing. For example, after the recording/scanning operation is continuously repeated n times, a recording medium can be carried by an amount equivalent to one band width. In each case, an intended image can be obtained.

Furthermore, there is a recording method for forming an image by combining a plurality of recording/scanning operations and a predetermined amount of carrying operation.

The soluble organic solvent for the ink discharged from an inkjet recording head (which may be referred to as "recording head") according to the present embodiment is any soluble organic solvent for the conventionally known inks.

Figure 2:
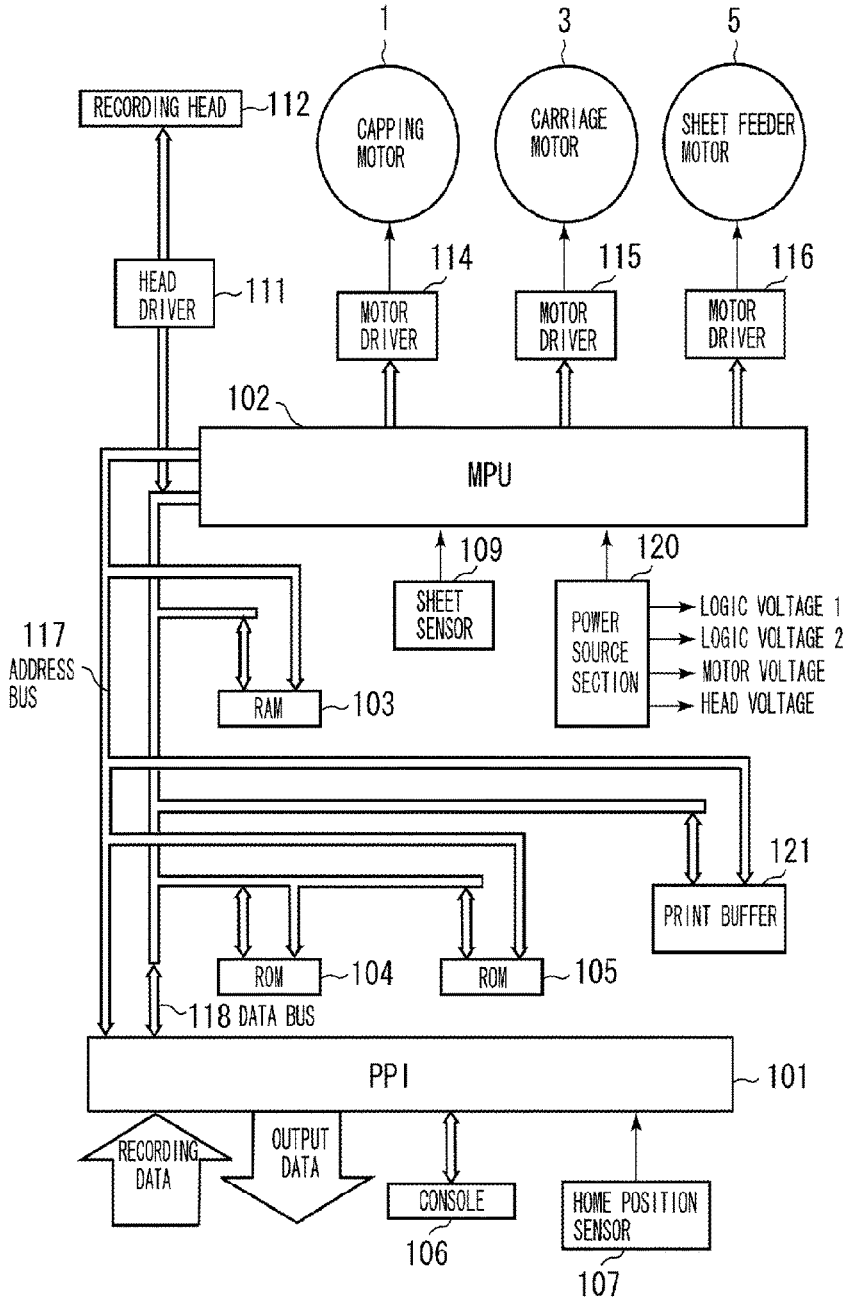
FIG. 2 is a block diagram illustrating an exemplary control section of the recording apparatus illustrated in FIG. 1.

FIG. 2 is a block diagram illustrating a control section of the recording apparatus 10 illustrated in FIG. 1. In FIG. 2, a programmable peripheral interface (hereinafter, referred to as "PPI") 101 receives a command signal (command) and a recording information signal sent from a host computer (not illustrated, hereinafter referred to as "host") and transfers the received signals to a micro processing unit (MPU) 102.

Furthermore, the PPI 101 receives a control signal and an instruction signal from a console 106 and a detection signal from a home position sensor 107 that detects the carriage 2 in a home position.

MPU 102 can control various portions of the recording apparatus 10 according to a control program stored in ROM 105. RAM 103 stores the signals received from the host computer, while functioning as a work area of the MPU 102, and can temporarily store various recording data.

ROM 104 stores various pattern information including letters and symbols corresponding to code information for the recording font, and can output pattern information corresponding to the input code information.

A print buffer 121 stores bitmap data which can be obtained by expanding the pattern data read from ROM 104 and recording information transmitted from the host. The print buffer 121 has a sufficient storage capacity for the bitmap data required in a single recording/scanning operation by the recording head.

The ROM 105 stores a processing program that the MPU 102 can execute to control the above-described sections via an address bus 117 and a data bus 118.

The carriage motor 3 can generate a driving force for shifting the carriage 2 with a recording head 112 mounted thereon to realize a scanning operation in a predetermined direction. The sheet feeder motor 5 generates a driving force for carrying a recording medium. The capping motor 1 is driven when a cap member is attached to or detached from a discharge port surface of the recording head 112 or in a wiping operation by a wiper that can remove an ink adhering on the discharge port surface.

A sheet sensor 109 can detect the presence of a recording medium. Based on a detection signal from the sheet sensor 109, the MPU 102 can determine whether a recording medium is conveyed to a position where the recording head 112 can perform a recording operation.

Motor drivers 114 through 116 drive the capping motor 1, the carriage motor 3, and the sheet feeder motor 5, respectively. The console 106 includes keyboard switches and display lamps. Furthermore, the home position sensor 107 is provided in the vicinity of the home position of the carriage 2. The home position sensor 107 can detect the carriage 2 carrying the recording head 112 if the carriage 2 reaches the home position.

In the present embodiment, the recording head 112 is a thermal inkjet recording head that can generate thermal energy for causing film boiling to discharge an ink droplet. The recording head 112 includes m (e.g., 64) ink discharge ports and m electro-thermal transducers (i.e., heaters) disposed in association with respective ink discharge ports. A head driver *111* drives an associated heater of each recording head 112 based on a recording information signal.

The recording apparatus 10 is connected to an external apparatus (e.g., a host computer, a camera, or a scanner) via the PPI 101. The MPU 102 can control a recording operation based on a command or a recording information signal received from the external apparatus, a control program stored in the ROM 105, and recording information stored in the RAM 103. A power source section 120 supplies electric power to various sections. The power source section 120, functioning as a driving power source apparatus, includes an AC adapter and a battery.

Figure 3:
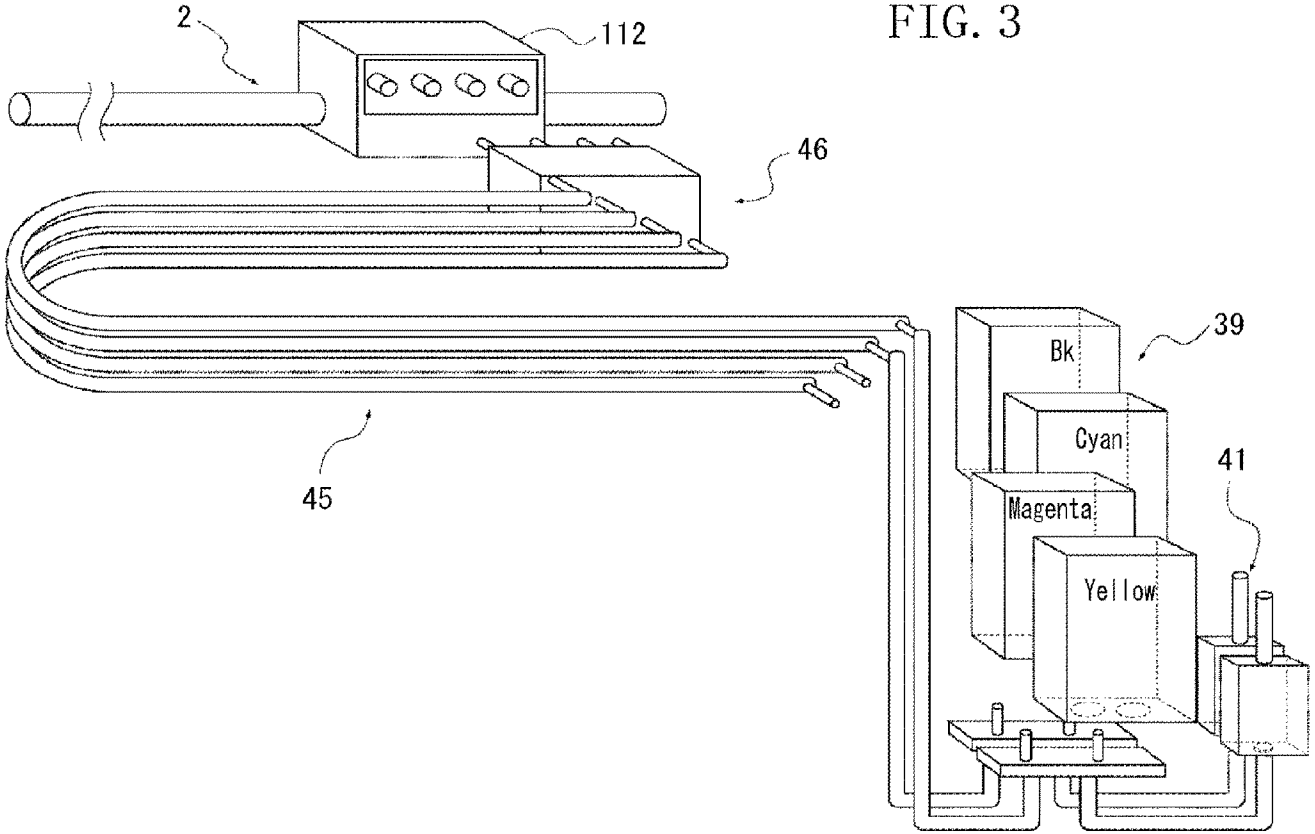
FIG. 3 illustrates an exemplary ink supply arrangement.

FIG. 3 illustrates an exemplary ink supply arrangement. As illustrated in FIG. 3, the recording apparatus 10 according to the present embodiment executes a recording operation using four color inks, i.e., black ink (Bk), cyan ink (Cyan), magenta ink (Magenta), yellow ink (Yellow). Each ink is supplied from an ink tank 39 to the recording head 112 via a tube 45 and a joint 46. An ink buffer 41 can temporarily store ink overflowing from the ink tank if expansion of air occurs in a supply passage (chiefly, in the tank).

Each ink tank 39 can be fabricated by injection blow molding of a resin, such as polypropylene (PP) or polyethylene (PE), and can be assembled by ultrasonic welding, thermal welding, bonding, or coupling. The ink tank 39 may have an interior serving as an ink chamber or include a bag filled with an ink, or may include a porous member that can adsorb the ink and generate a negative pressure.

A mechanism for generating a negative pressure in an ink tank 39 can be realized by a spring mechanism provided inside or outside the bag capable of expanding the bag in the ink tank 39.

Figure 4:
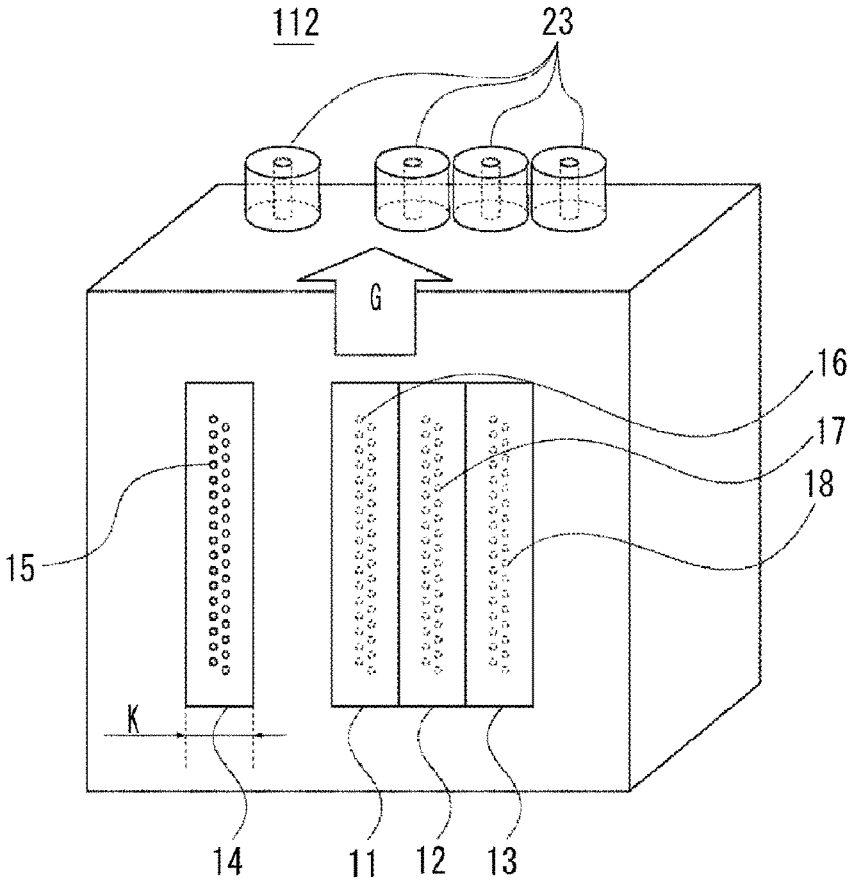
FIG. 4 is a perspective diagram illustrating an appearance of an exemplary recording head of the recording apparatus illustrated in FIG. 1.

FIG. 4 is a perspective diagram illustrating an appearance of the recording head 112. As illustrated in FIG. 4, the recording head 112 includes a black head 14 discharging a black ink from a plurality of nozzles 15. Furthermore, the recording head 112 includes a cyan head 11 discharging a cyan ink from a plurality of nozzles 16, a magenta head 12 discharging a magenta ink from a plurality of nozzles 17, and a yellow head 13 discharging a yellow ink from a plurality of nozzles 18.

The black head 14 includes 640 nozzles disposed at a density equal to approximately 245 nozzles per cm. Each of the cyan head 11, the magenta head 12, and the yellow head 13 includes 1280 nozzles disposed at a density equal to approximately 490 nozzles per cm. The recording head 112 includes four supply ports 23 for supplying inks corresponding to the heads 11 through 14.

A wiper (not shown), supported by a wiper holder with a wiper fixing metal (not shown), can remove dusts or ink waste adhering on the discharge port surface of the recording head 112. The wiper, driven in a direction indicated by an arrow G in FIG. 4, can wipe orifices and an outer surface of the recording head 112. When a wiping operation by the wiper is accomplished, the carriage 2 moves away from the wiping region and the wiper shifts in a direction opposed to the G direction and returns to a wiping start position.

Figure 5A:
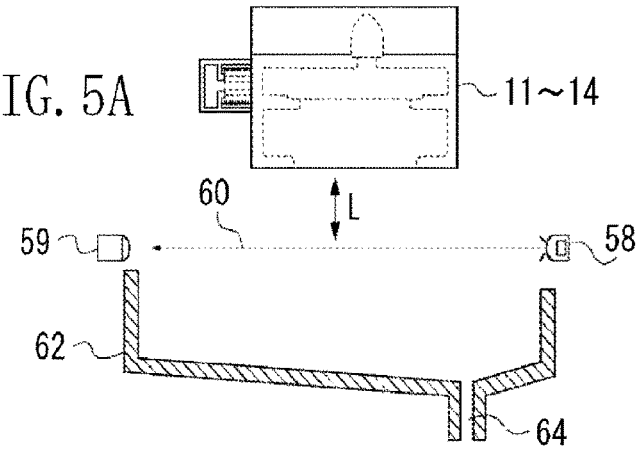
FIGS. 5A through 5C illustrate a mechanism for optically detecting ink discharge defectiveness.
Figure 5B:
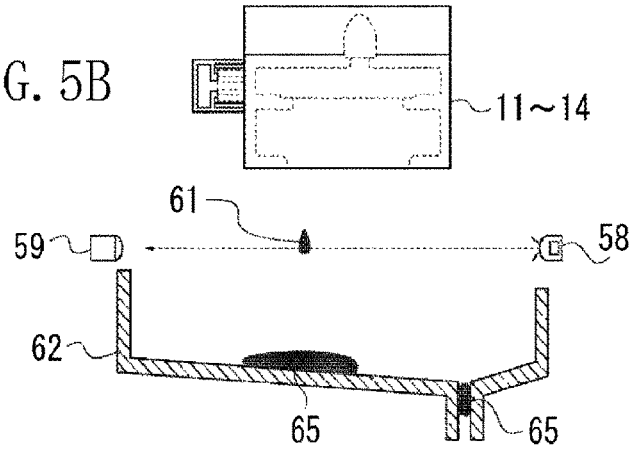
Figure 5C:
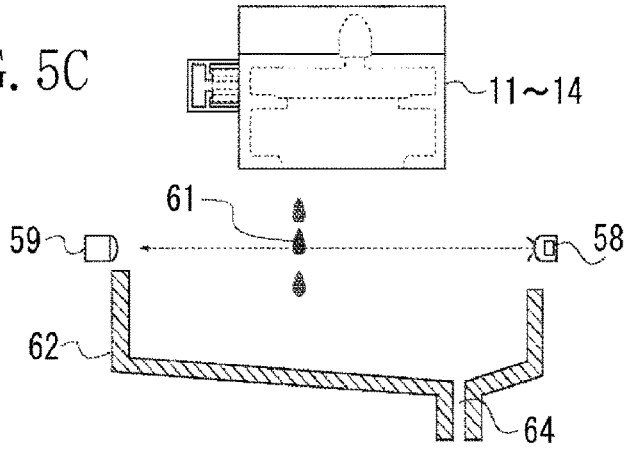

Next, exemplary ink discharge defectiveness detection according to the present embodiment will be described. FIGS. 5A through 5C illustrate a mechanism for optically detecting ink discharge defectiveness.

In the present embodiment, an optical sensor includes a light-emitting element 58 and a light-receiving element 59 which can detect a discharge state of the ink. For example, as illustrated in FIG. 5A, the light-emitting element 58 is a light-emitting diode (LED)) that can emit light. The light-receiving element 59 is a photodiode opposing the light-emitting element 58 that can receive the light emitted from the light-emitting element 58.

A span between the light-emitting element 58 and the light-receiving element 59 is wider than a width of the recording head 112, so that four heads 11 through 14 can be disposed between the light-emitting element 58 and the light-receiving element 59.

In the present embodiment, the light-emitting element 58 and the light-receiving element 59 are disposed in a positional relationship such that a center (optical axis) 60 of the light emitted from the light-emitting element 58 becomes substantially parallel to a longitudinal direction of the nozzle array along which plural nozzles are disposed.

According to the optical sensor of the present embodiment, an ink droplet discharged from the head 11 through 14 can block the light emitted from the light-emitting element when the ink droplet passes across the optical axis 60. Thus, the optical sensor can detect an ink droplet based on reduction in the quantity of light received by the light-receiving element 59.

However, an actual arrangement of the heads 11 through 14 may not allow all of ink droplets discharged from their discharge ports within a detection region of the optical sensor (i.e., within a clearance between the light-emitting element 58 and the light-receiving element 59).

In such a case, moving (shifting) each head 11 through 14 to a detection range of the optical sensor is desirable because each head 11 through 14 can discharge an ink droplet within a detectable range. After a discharge state detecting operation for one head 11 through 14 is completed, the recording head 112 is slightly shifted so that a discharge state detecting operation for the next head 11 through 14 can be performed.

If desirable, the optical axis 60 of the light-emitting element 58 and the light-receiving elements 59 can be disposed along an oblique line relative to the longitudinal direction of the nozzle array. According to this arrangement, the discharge state of ink can be detected by discharging an ink droplet from the head 11 through 14 continuously shifting.

When no discharge port of the head 11 through 14 is positioned in the detection range of the optical sensor, or when the head 11 through 14 cannot adequately discharge an ink droplet from a discharge port, no ink droplet can pass across the optical axis 60 as illustrated in FIG. 5A. The light emitted from the light-emitting element 58 directly reaches the light-receiving element 59 without causing substantial reduction in the light quantity. Thus, an output signal level of the light-receiving element 59 does not decrease. Therefore, based on the output of the optical sensor, the MPU 102 can determine that the discharge state of ink is in a defective state or in a non-discharge state.

On the other hand, when a discharge port of the head 11 through 14 is positioned in the detection range of the optical sensor, and when the head 11 through 14 can adequately discharge an ink droplet from a discharge port, the ink droplet 61 discharged from the head (11 through 14) passes across the optical axis 60 as illustrated in FIG. 5B. As a result, the light-receiving element 59 can receive a reduced light quantity and produce a reduced output signal. Therefore, the MPU 102 determines that the discharge state of ink is good (normal).

The ink droplet 61, discharged to detect the discharge state of ink, is received by an ink receiver 62 (i.e., waste ink 65) as illustrated in FIG. 5B, and drained from an ink drain port 64 to a waste ink absorption member (not illustrated).

If the recording apparatus 10 has no absorption unit such as a waste ink absorption member, the waste ink can be collected by an ink reservoir having an appropriate volume.

FIG. 5C illustrates ink droplets continuously discharged so as to pass across the optical axis 60. Continuously discharging ink droplets from the head 11 through 14 is useful to accurately detect the discharge state of ink.

If a discharged ink droplet is offset, a relatively smaller amount of the ink droplet can pass across the optical axis 60. Thus, the optical sensor has a decreased detection range. In this case, the output signal level of the light-receiving element 59 is higher than the signal level obtained when the discharge state of ink is good and is lower than the signal level obtained when the discharge state is in a non-discharge state. Thus, the MPU 102 determines that the discharge state is in a defective state if the output signal level is equal to or greater than a predetermined level.

Figure 6:
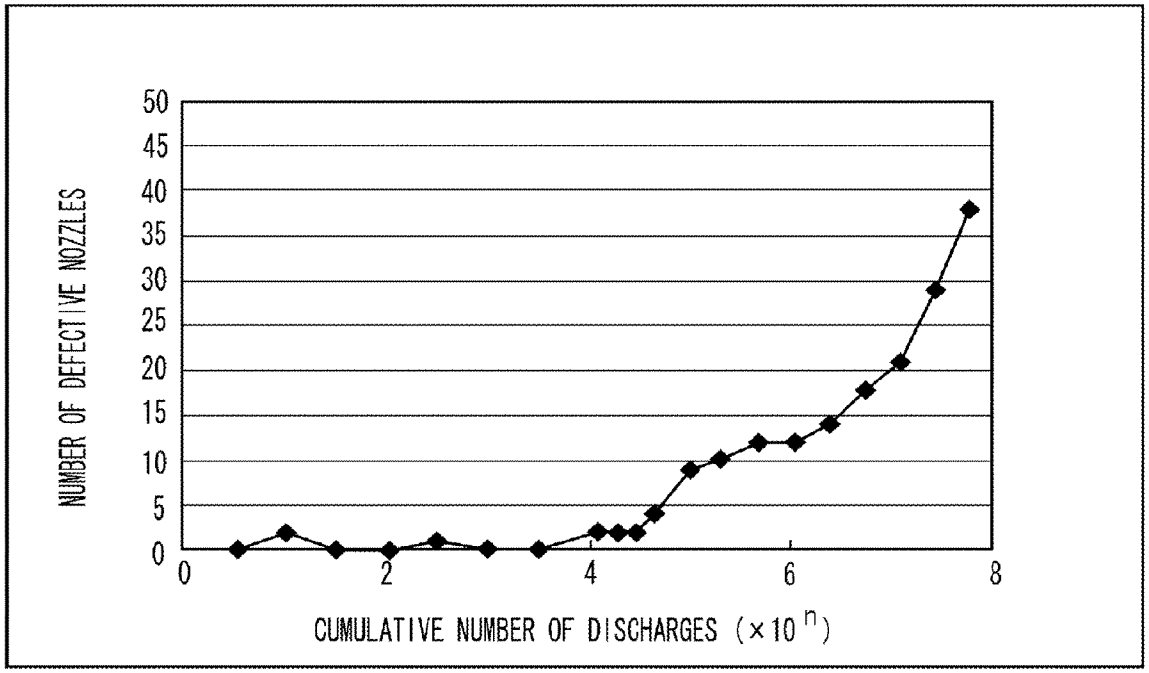
FIG. 6 is a graph illustrating an experimental relationship between a cumulative number of discharges and the number of defective nozzles according to a first exemplary embodiment.

FIG. 6 is a graph illustrating an exemplary relationship between the number of discharges from a recording head and the number of defective nozzles, experimentally obtained through the recording operation of the recording apparatus.

As illustrated from FIG. 6, the number of discharge ports in a defective discharge state remains in a relatively lower level when the total number of ink droplets discharged from a recording head (i.e., "total number of discharges" or "cumulative number of discharges") is less than $4\times10^n$. On the other hand, the number of discharge ports in a defective discharge state tends to increase if the cumulative number of discharges exceeds $4\times10^n$.

If the operation time of a recording apparatus becomes longer, paper dusts or the like tend to accumulate in the recording apparatus. The paper dusts or the like adhere on the discharge port surface. Surface abrasion of heaters increases when the cumulative number of discharges increases. Therefore, the generation rate of discharge defectiveness rapidly increases.

When an image is formed by a recording head including a defective discharge port, the image may include a white region (which may be referred to as "white streak") on a white recording medium if no ink droplet can be discharged to a target impact point on a recording medium. When the impact points of a plurality of ink droplets overlap with each other, an image including concentration unevenness (black streak) may be formed.

To form a high-quality image including no white streak or no black streak when the cumulative number of discharges is equal to approximately $8\times10^n$, the discharge state of ink can be detected at an interval equivalent to approximately $0.1\times10^n$ in the number of discharges and perform the cleaning processing (recovery operation) if any defective discharge state is detected.

Furthermore, if any defective discharge state remains even after the cleaning processing, non-discharge complementary processing can be executed instead of discharging an ink from a defective discharge port. The non-discharge complementary processing can form an image by using other discharge port that can discharge an ink to be discharged from the defective discharge port.

According to a conventional recording apparatus, for the purpose of setting a larger margin of safety (i.e., to improve the reliability of the recording apparatus), the discharge state of ink is constantly detected at an interval equivalent to approximately $0.1\times10^n$ in the number of discharges and the cleaning processing or non-discharge complementary processing is performed based on the detection result.

However, if the discharge state detection processing is frequently performed, a relatively large amount of ink is consumed for the detection processing. Moreover, a relatively long time is required to accomplish the discharge state detection processing because of densely arrayed discharge ports. As a result, the throughput is decreased.

Hence, the present embodiment sets an interval variable depending on the cumulative number of discharges for performing the discharge state detection processing, and controls the discharge state detection processing based on the changeable interval. Thus, the present embodiment can reduce the consumption of ink discharged for the detection processing while limiting reduction in the throughput, and can form a high-quality image.

Figure 7:
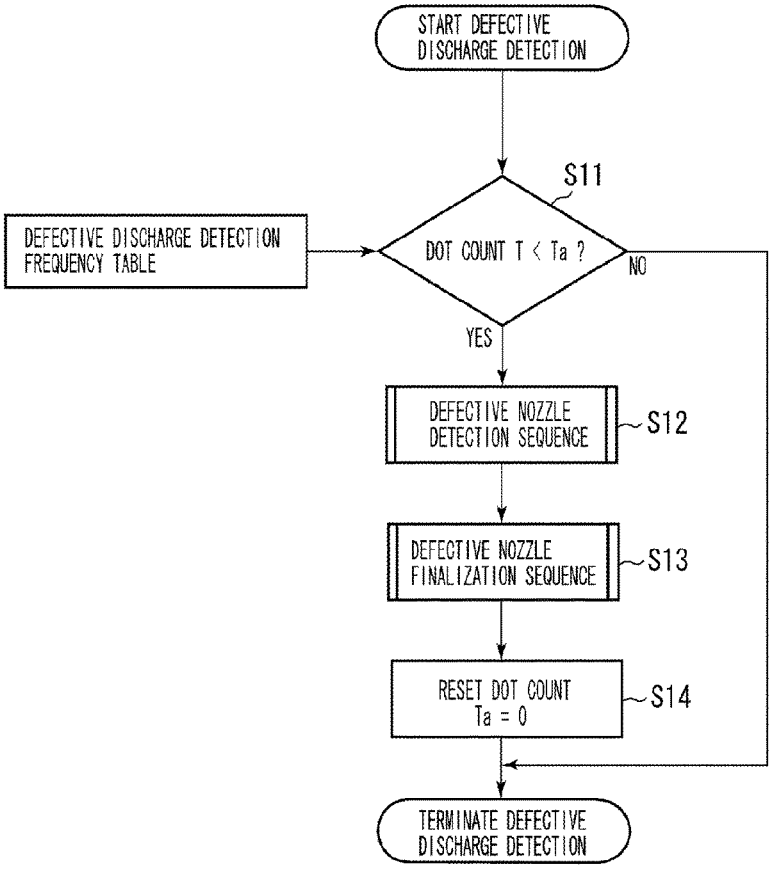
FIG. 7 is a flowchart illustrating defective discharge detection processing according to the first exemplary embodiment.

FIG. 7 is a flowchart illustrating exemplary discharge state detection processing (i.e., defective discharge detecting operation) according to the present embodiment.

In step S11, the MPU 102 determines whether defective discharge detection processing (i.e., processing for detecting the discharge state of ink discharged from the recording head) is necessary. More specifically, the MPU 102 compares a discharge number Ta (i.e., the number of ink discharges from the recording head which is counted after the previous defective discharge detection processing is completed) with a threshold dot count value T.

The MPU 102 can set the threshold dot count value T to an appropriate value referring to a table stored in the ROM 105 that defines a relationship between the cumulative number of discharges and a preferable frequency of the defective discharge detection for the recording apparatus 10.

The defective discharge detection frequency table can be prepared based on experimental data as illustrated in FIG. 6, which indicates an exemplary relationship between the number of defective nozzles and a cumulative number of discharges of a recording apparatus.

If, in step S11, the MPU 102 determines that the discharge number Ta is greater than the threshold dot count value T, the MPU 102 executes a defective nozzle detection sequence (i.e., processing for detecting discharge ports in a defective state) in step S12.

If, in step S11, the MPU 102 determines that the discharge number Ta is not greater than the threshold dot count value T, the MPU 102 terminates the processing of this routine without executing the defective discharge detection processing.

In step S12, the MPU 102 executes the defective nozzle detection sequence based on the output level of the optical sensor that can detect the discharge state of ink discharged from the head 11 through 14 as illustrated in FIGS. 5A through 5C.

In this case, the MPU 102 detects either a non-discharge nozzle of the recording head or detects a non-discharge nozzle as well as any other defective nozzle (e.g., an insufficient-discharge nozzle or a deviated-discharge nozzle).

Excluding all nozzles in any defective discharge state (including non-discharge nozzles and insufficient-discharge or other defective nozzles) in a recording operation is effective to form a high-quality image using the remaining normal nozzles (i.e., the nozzles other than the detected nozzles).

Detecting only the non-discharge nozzles and performing the non-discharge complementary recording can eliminate formation of white dots or generation of white streaks on an image and is useful to simply improve the image quality to a satisfactory level.

Next, in step S13, the MPU 102 compares the defective nozzle(s) detected in step S12 with the detection result of previous defective discharge detection processing (i.e., defective nozzle(s) detected in the previous defective discharge detection processing).

In step S13, the MPU 102 determines whether the currently detected defective nozzle(s) can be finalized as defective nozzle(s), based on the comparison result.

Next, in step S14, the MPU 102 resets a count value of a counter that can count the discharge number Ta (i.e., the number of ink discharges from the recording head which is counted after the previous defective discharge detection processing is completed). Then, the MPU 102 terminates the processing of this routine.

If the MPU 102 determines a defective nozzle in step S13, the MPU 102 can perform a complementary recording operation that uses other normal nozzles to form an image without using the defective nozzle. In the complementary recording operation, the MPU 102 reallocates recording data to a normal nozzle adjacent to the defective nozzle so that any neighboring normal nozzle can discharge an ink to be discharged from the defective nozzle.

Alternatively, the MPU 102 can reallocate the recording data to other normal nozzles capable of discharging an ink to the same position in other recording/scanning operation so that any designated normal nozzle can discharge an ink to be discharged from the defective nozzle.

FIG. 8 illustrates an exemplary relationship between the cumulative number of discharges and the defective discharge detection frequency obtained by the recording apparatus according to the present embodiment.

A conventional recording apparatus performs the defective discharge detection processing at a constant interval equivalent to $1.1\times10^n$ in the number of discharges, regardless of the cumulative number of discharges. Therefore, execution of the defective discharge detection processing increases up to 80 times in total when the cumulative number of discharges reaches $8\times10^n$.

Repeatedly performing the defective discharge detection processing significantly decreases the throughput of the recording apparatus. Moreover, a relatively large amount of ink is consumed for such trial ink discharges. As a result, the *conventional* recording apparatus [10] requires an increased running cost.

The recording apparatus 10 according to the present embodiment performs the defective discharge detection processing at an interval equivalent to $0.5\times10^n$ in the number of discharges if the cumulative number of discharges does not reach $4\times10^n$. In this region, the generation rate of defective nozzles does not increase as rapidly, although the discharge defectiveness may occur at a lower probability due to clogging or bubbles. Therefore, the defective discharge detection processing can be performed at a lower frequency.

On the other hand, the recording apparatus 10 according to the present embodiment performs the defective discharge detection processing at an interval equivalent to $0.3\times10^n$ in the number of discharges if the cumulative number of discharges is in a range from $4\times10^n$ to $6\times10^n$.

Furthermore, the recording apparatus 10 according to the present embodiment performs the defective discharge detection processing at an interval equivalent to $0.1\times10^n$ in the number of discharges if the cumulative number of discharges is in a range from $6\times10^n$ to $8\times10^n$.

To this end, the recording apparatus 10 according to the present embodiment gradually changes the threshold value T depending on the cumulative number of discharges, so that the interval for executing the defective discharge detection processing decreases when the cumulative number of discharges increases.

The present embodiment changes/sets the threshold dot content value T depending on the cumulative number of discharges so as to optimize the defective discharge detection processing. The operation frequency of the defective discharge detection processing is changeable depending on the cumulative number of discharges.

When the cumulative number of discharges is large, the number of defective nozzles increases rapidly due to paper dusts or the like adhering on the discharge port surface or abrasion of heaters. Therefore, increasing the operation frequency in a stepwise fashion is useful for optimizing the defective discharge detection processing.

As described above, the present embodiment changes the operation frequency of the defective discharge detection processing depending on the cumulative number of discharges. Therefore, the total number of defective discharge detecting operations can be reduced to 34. The time for the defective discharge detection processing can also be reduced.

Furthermore, the present embodiment can reduce the consumption amount of ink. As a result, the throughput of the recording apparatus can be improved. The running cost of the recording apparatus can also be reduced. Furthermore, the present embodiment can reduce the problems in an image formed by the recording head including a defective nozzle.

The present embodiment is not limited to the above-described control that changes the operation frequency of the defective discharge detection processing based on the cumulative number of discharges of the recording apparatus 10. For example, the operation frequency of the defective discharge detection processing can be changed depending on a cumulative recording area, a cumulative recording sheet number, a cumulative scanning number, or a cumulative discharge amount of a recording apparatus.

Furthermore, the operation frequency of the defective discharge detection processing can be changed based on a cumulative operation time of the recording apparatus 10 or based on an operation time of a recording head 112 installed on the recording apparatus 10. In short, the present embodiment can change the operation frequency of the defective discharge detection processing depending on any other parameter relating to a cumulative recording amount.

In a situation where the generation rate of defective discharge changes, the defective discharge detection frequency can be adequately changed. The present embodiment can perform the defective discharge detection at optimum timing based on the amount of printing operations.

Furthermore, the present embodiment is not limited to the above-described control that increases the operation frequency of the defective discharge detection processing when the cumulative recording amount of the recording apparatus 10 is increased.

For example, the operation frequency of the defective discharge detection processing can be reduced if the defective discharge generation rate is decreased in accordance with the cumulative recording amount. The present embodiment can appropriately control the defective discharge detection at an optimum frequency.

Moreover, the present embodiment is not limited to the above-described defective nozzle detecting method requiring an optical system. For example, a user can determine a defective nozzle based on a nozzle check pattern recorded by the recording apparatus 10. Furthermore, a defective nozzle can be determined by reading a nozzle check pattern.

Moreover, according to a bubble jet system that generates thermal energy for discharging an ink, the temperature of a recording head or ink stored therein is variable depending on the presence of any defective nozzle. Thus, the discharge state of ink can be detected based on the temperature of the recording head or ink stored therein.

In general, the thermal energy applied to an ink can be converted into kinetic energy for an ink droplet discharged from a recording head, in a normal discharge state. However, if the nozzle is in a defective discharge state where an ink droplet cannot be normally discharged, the temperature of the recording head or ink stored therein may increase due to the remaining thermal energy.

The threshold dot count value T can be set at appropriate timing, e.g., when a power source for the recording apparatus is turned on, or in response to initialization processing, or when the power source is turned off, or when a recording operation starts in response to reception of a recording signal. Furthermore, the threshold dot count value T can be set when a recording operation is terminated, or before/after one recording/scanning operation or a recording operation of one page.

When the threshold value dot count T is set in response to turning-on of the power source of the recording apparatus 10, the setting frequency is relatively small and therefore the processing can be simplified. When threshold dot count value T is set before/after one recording/scanning operation or a recording operation of one page, the defective discharge detection processing can be precisely executed based on the cumulative recording amount while the control becomes in some degree complicated.

The flowchart of FIG. 7 includes the defective nozzle detection sequence performed in step S12 based on the determination in step S11. However, if the recording apparatus 10 is currently performing a recording operation, the MPU 102 can suspend, for a predetermined time, the detective nozzle detection sequence.

If the detective nozzle detection sequence is executed during a recording operation (between recording/scanning operations), a significant dormant period is present between successive recording/scanning operations. Such a time difference may cause concentration unevenness.

Hence, if the detective nozzle detection sequence is requested during a recording operation, the MPU 102 can postpone the detective nozzle detection sequence until a recording operation for one page is completely terminated, or until a recording job is completely terminated.

In another embodiment of the present invention, a cumulative number of discharges (i.e., a dot count value) can be stored for each nozzle array and the operation frequency of the defective discharge detection processing for each nozzle array can be controlled based on the dot count value. The cumulative number of discharges is a parameter relating to the cumulative recording amount. The present embodiment describes an exemplary method for counting a parameter relating to the cumulative recording amount and setting of the threshold value T, although the present embodiment can use an inkjet recording apparatus as described above.

Figure 9:
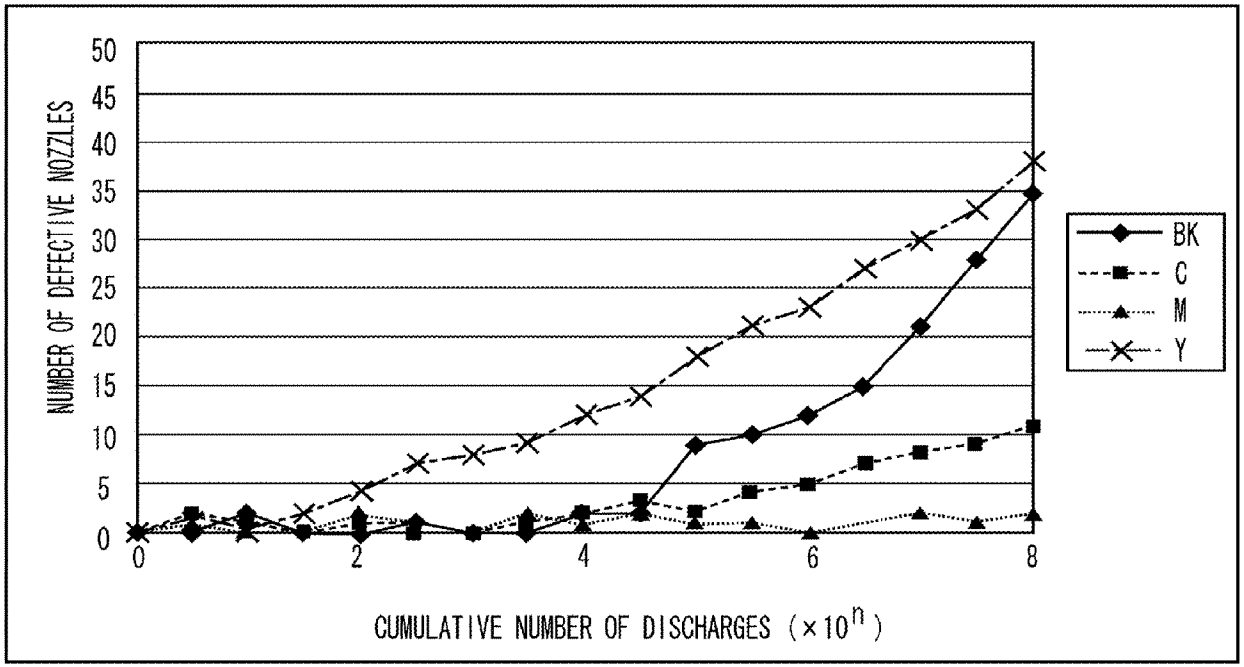
FIG. 9 is a graph illustrating an experimental relationship between a cumulative number of discharges and the number of defective nozzles in each nozzle array according to the second exemplary embodiment.

FIG. 9 is a graph illustrating an experimental relationship between a cumulative number of discharges and the number of defective nozzles in each nozzle array of a recording apparatus according to the present embodiment.

Similar to the first exemplary embodiment, the generation rate of defective nozzles in a nozzle array discharging a black ink does not increase as rapidly when the cumulative number of discharges is less than $4\times10^{n}$, although the discharge defectiveness may arise at a lower probability due to clogging or bubbles.

On the other hand, when the cumulative number of discharges exceeds $4\times10^n$, there is a tendency that the discharge defectiveness increases rapidly due to paper dusts or the like adhering on the discharge port surface or abrasion of heaters.

However, the generation of defective nozzles is greatly dependent on the composition of an ink or discharge characteristics. As illustrated in FIG. 9, the generation rate of defective nozzles in a nozzle array discharging a yellow ink starts increasing when the cumulative number of discharges reaches $2\times10^n$. The generation rate of defective nozzles in a nozzle array discharging a magenta ink does not increase greatly before the cumulative number of discharges reaches $8\times10^n$.

In such a case, it is common to execute the defective discharge detection with a larger margin of safety, so that no recording defectiveness occurs in a nozzle array having a highest defective nozzle generation frequency.

However, if the defective discharge detection is executed so frequently also for a nozzle array having a lower defective nozzle generation frequency, the processing time and the consumption of ink for trial discharges significantly increase.

Therefore, the present embodiment stores a cumulative number of discharges for each nozzle array and sets an optimum frequency for the defective discharge detection processing based on the cumulative number of discharges of each nozzle array. Furthermore, the present embodiment performs the defective discharge detection processing for a nozzle array which requires the processing.

Figure 10:
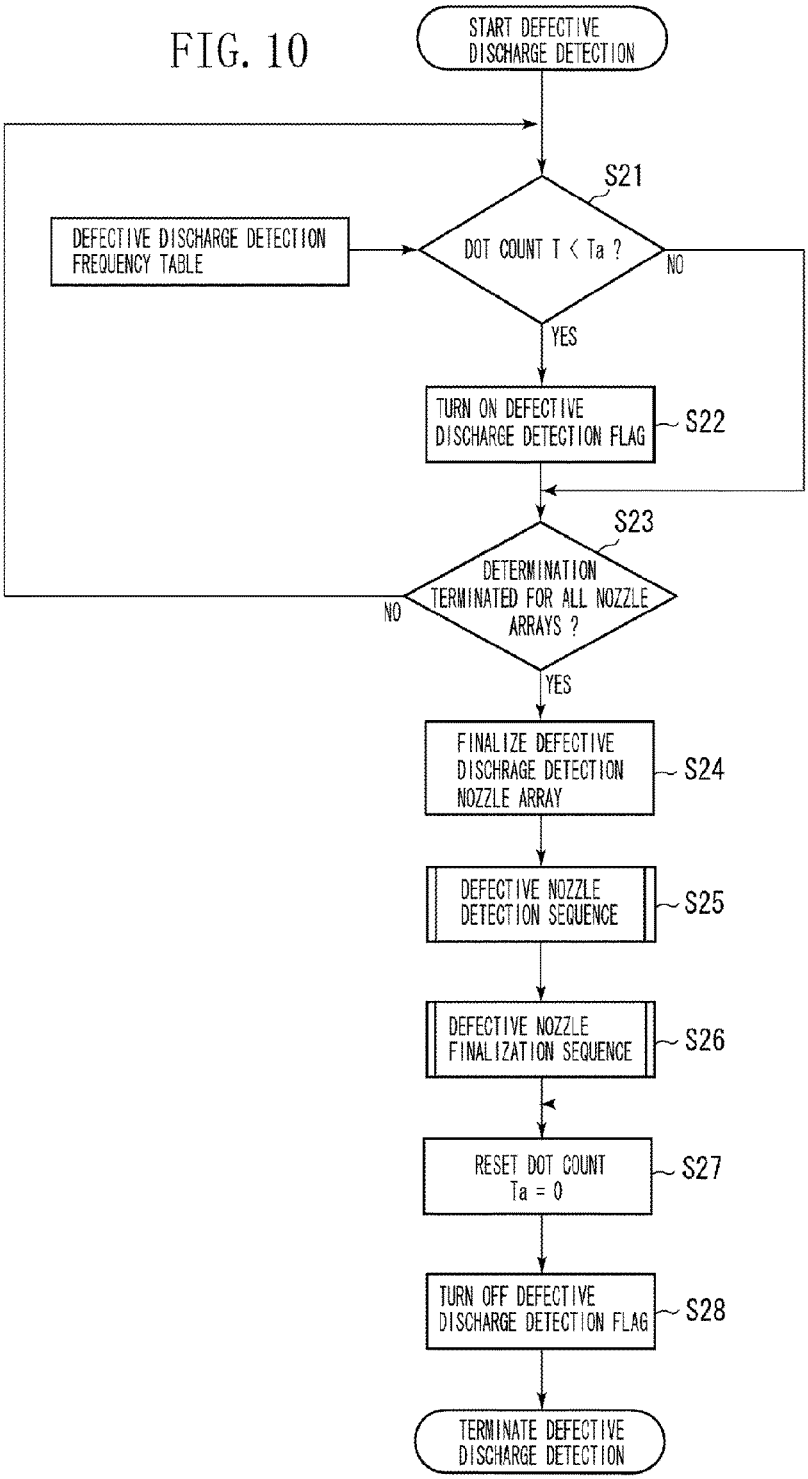
FIG. 10 is a flowchart illustrating defective discharge detection processing according to the second exemplary embodiment.

FIG. 10 is a flowchart illustrating defective discharge detection processing according to the present embodiment.

In step S21, the MPU 102 reads a defective discharge detection threshold dot count T for each nozzle array from the ROM 105 that stores a table defining a relationship between the cumulative number of discharges and the defective discharge detection frequency of each nozzle array.

More specifically, the MPU 102 compares the discharge number Ta (i.e., the number of ink droplets discharged from the recording head which is counted after the previous defective discharge detection processing is completed) with a threshold dot count value T.

If the discharge number Ta of any nozzle array is greater than the threshold dot count value T, then in step S22, the MPU 102 turns on a defective discharge detection flag of the nozzle array. If the discharge number Ta is not greater than the threshold dot count value T, the MPU 102 continues the comparison of other nozzle arrays without turning-on a flag.

In step S23, a check is made whether the determination processing has been completed for all nozzle arrays. If the determination processing is completed for all nozzle arrays, flow proceeds to step S24, where the MPU 102 finalizes each nozzle array having a turned-on flag as a defective discharge detection nozzle array. Then, in step S25, the MPU 102 performs the defective nozzle detection sequence with respect to the nozzle array in which the defective discharge was detected.

In step S26, the MPU 102 compares the defective nozzle(s) detected in step S25 with the detection result of previous defective discharge detection processing (i.e., defective nozzle(s) detected in the previous defective discharge detection processing). Then, the MPU 102 determines whether the currently detected defective nozzle(s) can be finalized as defective nozzle(s), based on the comparison result.

Next, in step S27, the MPU 102 resets the discharge number Ta exclusively for the nozzle array having been subjected to the defective discharge detection. Then, in step S28, the MPU 102 turns the defective discharge detection flag off.

FIG. 11 is a table illustrating an exemplary relationship between a cumulative number of discharges and the operation frequency of the defective discharge detection processing of each nozzle array of a recording apparatus according to the present embodiment.

According to a conventional recording apparatus, the defective discharge detection is constantly performed at an interval equivalent to approximately $0.1\times10^n$ in the number of discharges for all nozzle arrays regardless of the cumulative number of discharges. In other words, the conventional recording apparatus does not change the operation frequency of the defective discharge detection processing.

Therefore, execution of the defective discharge detection processing increases up to 80 times in total when the cumulative number of discharges reaches $8\times10^n$. The processing time for each nozzle array is approximately one minute. Therefore, the total processing time is 320 minutes (=80 (times)×1 (min)×4 (total number of nozzle arrays).

The present embodiment executes the defective discharge detection processing for each nozzle array based on the cumulative number of discharges of each nozzle array.

More specifically, the present embodiment determines a threshold value for a nozzle array discharging a black ink so that the defective discharge detection processing is performed at an operation frequency gradually increasing in response to the increasing cumulative number of discharges (e.g., at the interval equivalent to $0.5\times10^n$, $0.3\times10^n$, and $0.1\times10^n$ in the number of discharges).

Similarly, the present embodiment determines a threshold value for a nozzle array discharging a cyan ink so that the defective discharge detection processing is performed at an operation frequency gradually increasing in response to the increasing cumulative number of discharges (e.g., at the interval equivalent to $0.5\times10^n$, and $0.3\times10^n$ in the number of discharges).

The present embodiment determines a threshold value for a nozzle array discharging a magenta ink or a yellow ink so that the defective discharge detection processing is performed at a constant frequency (e.g., at the interval equivalent to $0.5\times10^n$ and $0.3\times10^n$ in the number of discharges respectively) regardless of the cumulative number of discharges.

As described above, the present embodiment can efficiently execute the defective discharge detection processing by setting a higher operation frequency for the defective discharge detection processing applied to a nozzle array having a higher generation frequency of discharge defectiveness and setting a lower operation frequency for the defective discharge detection processing applied to a nozzle array having a lower generation frequency of discharge defectiveness.

Furthermore, as described in the present embodiment, when the generation frequency of discharge defectiveness increases in accordance with an increase in the cumulative number of discharges, the operation frequency of the defective discharge detection processing for each nozzle array can be set to be correspondingly higher.

In the present embodiment, the defective discharge detection processing applied to a black ink nozzle array takes 34 minutes (=34 (times)×1 (min)). Similarly, the processing time for a cyan ink nozzle array is 21 minutes (=21 (times)×1 (min)). The processing time for a magenta ink nozzle array is 16 minutes (=16 (times)×1 (min)). The processing time for a yellow ink nozzle array is 26 minutes (=26 (times)×1 (min)). The total processing time is 97 minutes. On the other hand, the conventional recording apparatus requires 320 minutes in total.

Thus, the present embodiment can reduce a total time for the defective discharge detection processing without degradation in reliability of the recording apparatus. The present embodiment can improve the throughput of the recording apparatus.

The present embodiment counts a cumulative number of discharges for each nozzle array and controls the defective discharge detection frequency for each nozzle array based on the cumulative number.

However, the defective discharge detection frequency can be controlled based on a cumulative number of discharges of a plurality of nozzle arrays. Moreover, when any one of the plurality of nozzle arrays requires the defective discharge detection, the defective discharge detection processing can be simultaneously performed for other nozzle arrays. In short, the defective discharge detection can be performed at an optimum interval corresponding to the generation frequency of discharge defectiveness of each nozzle array.

Moreover, the present embodiment is not limited to the above-described control that changes the defective discharge detection frequency when the cumulative number of discharges of each nozzle array exceeds a threshold value. For example, the defective discharge detection frequency can be changed based on a cumulative number of discharges detected in response to a turning-on of the electric power source, or when a recording operation for a predetermine number of sheets is completed. In short, the change timing can be appropriately optimized so as to reduce the processing time.

The number of discharges can be obtained by counting the number of ink droplets discharged from a recording head, or based on a signal (pulse) representing the discharge operation of a recording head.

Moreover, the cumulative recording amount can be obtained by counting the amount of discharged ink droplets instead of counting the number of the ink droplets.

Additionally, the cumulative recording amount can be obtained by counting not only the amount (number) of ink droplets for forming an image on a recording medium but also the amount (number) of ink droplets for preliminary discharge operations not contributing the formation of an image The present embodiment is not limited to the above-described control that counts a cumulative number of discharges for each nozzle array. For example, the cumulative number of discharges can be counted for a group of plural nozzle arrays (i.e., a chip on which plural nozzle arrays are formed).

In a third exemplary embodiment, the frequency of the defective discharge detection can change when the number of defective nozzles detected by the defective discharge detection exceeds a predetermined number.

Figure 12:
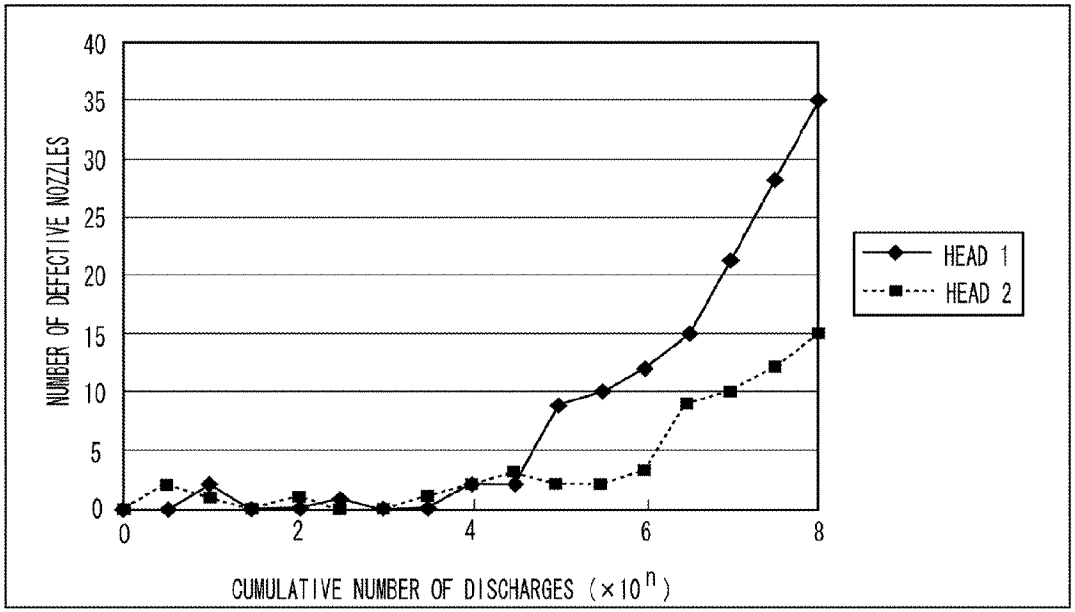
FIG. 12 is a graph illustrating an experimental relationship between a cumulative number of discharges and the number of defective nozzles in each recording head according to a third exemplary embodiment.

FIG. 12 is a graph illustrating an experimental relationship between a cumulative number of discharges and the number of defective nozzles in two different recording heads of an inkjet recording apparatus according to the third exemplary embodiment.

A recording head 1 and a recording head 2 are similar in arrangement and capable of discharging the same type of ink. However, the recording head 1 and the recording head 2 are different in the generation frequency of discharge defectiveness because of differences in the manufacturing processes or the environment where a recording apparatus is installed.

For example, the recording head 1 is similar to the above-described first exemplary embodiment in the generation rate of defective nozzles. On the other hand, the generation rate of defective nozzles in the recording head 2 does not increase as rapidly when the cumulative number of discharges is less than $6\times10^n$, although the discharge defectiveness may arise at a lower probability due to clogging or bubbles. However, there is a tendency that the discharge defectiveness increases when the cumulative number of discharges exceeds $6\times10^n$.

In general, the durability is variable due to differences in manufacturing processes and the environment in which a recording head is used (e.g., abrasion of heaters). In such cases, the defective discharge detection frequency can be set to assure a larger margin of safety based on the differences.

However, the defective discharge detection frequency may increase when the number of defective nozzles does not increase. On the contrary, the defective discharge detection frequency may not increase when the number of defective nozzles increases.

In this case, the reliability of the apparatus may decrease or the processing time may increase. According to the experimental data illustrated in FIG. 12, the number of defective nozzles in the recording head 2 is smaller compared to the number of defective nozzles in the recording head 1.

However, in a region where the cumulative number of discharges is small, the number of defective nozzles in the recording head 2 may become larger than the number of defective nozzles in the recording head 1.

Hence, the present embodiment starts counting a cumulative number of discharges when the number of defective nozzles detected in the defective discharge detection processing exceeds a predetermined number (threshold value), and stores the counted cumulative number in a RAM. Then, the present embodiment changes the defective discharge detection frequency based on the cumulative number of discharges.

Figure 13:
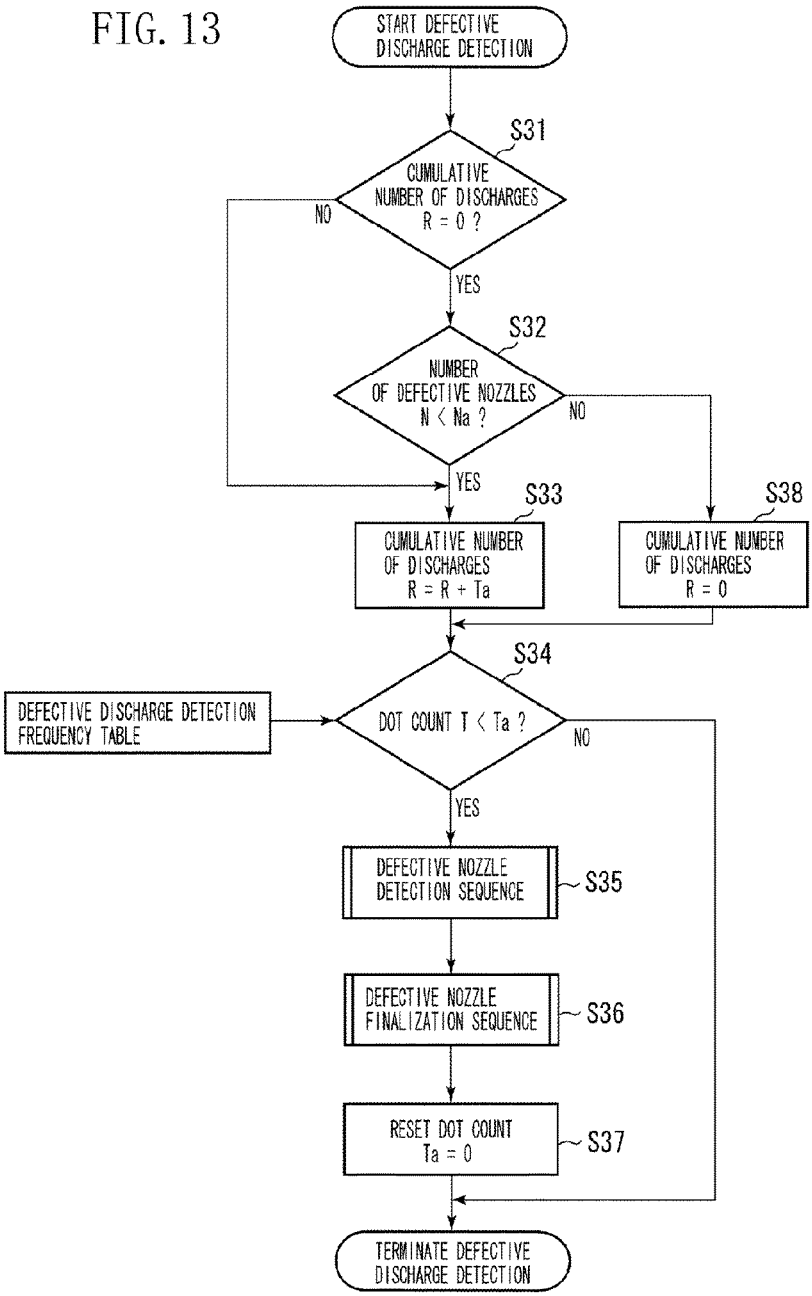
FIG. 13 is a flowchart illustrating detective discharge detection processing according to the third exemplary embodiment.

FIG. 13 is a flowchart illustrating defective discharge detection processing according to the present embodiment. In step S31, the MPU 102 determines a cumulative number R of discharges. If the MPU 102 determines that the cumulative number R is 0, flow proceeds to step S32, where the MPU 102 compares the number Na of defective nozzles detected by the defective discharge detection with a threshold value N.

If, in step S32, the MPU 102 determines that the number Na of defective nozzles is greater than the threshold value N, then in step S33, the MPU 102 starts to count the cumulative number of discharges. More specifically, the MPU 102 adds a cumulative number Ta of discharges counted after a previous defective discharge detection, to the cumulative number R of discharges, i.e., R=R+Ta.

If the number Na of defective nozzles is not greater than the threshold value N (i.e., NO in step S32), then in step S38, the MPU 102 resets the cumulative number R of discharges (i.e., R=0) and does not count the cumulative number of discharges.

In step S34, the MPU 102 reads a preferable discharge detection threshold dot count T from the ROM 105 that stores a table defining a relationship between the cumulative number of discharges and the defective discharge detection frequency of the recording apparatus.

The MPU 102 compares the cumulative number Ta of discharges counted after the previous defective discharge detection with the threshold dot count value T. If the cumulative number Ta is greater than the threshold dot count value T, flow proceeds to step S35, where the MPU 102 executes the defective nozzle detection sequence. If the cumulative number Ta is not greater than the threshold dot count value T (i.e., NO in step S34), the MPU 102 terminates the defective discharge detecting operation.

If any defective nozzle is detected in step S35, the MPU 102 compares the defective nozzle(s) detected in step S35 with the detection result of previous defective discharge detection processing (i.e., defective nozzle(s) detected in the previous defective discharge detection processing). Then, in step S36, the MPU 102 determines whether the currently detected defective nozzle(s) can be finalized as defective nozzle(s), based on the comparison result. Next, in step S37, the MPU 102 resets the cumulative number Ta of discharges counted after the previous defective discharge detection.

FIG. 14 is a table illustrating a relationship between the cumulative number of discharges and the defective discharge detection frequency according to the present embodiment. When the number of defective nozzles is less than the threshold value, the cumulative number of discharges is 0. The generation rate of discharge defectiveness does not increase so rapidly, although the discharge defectiveness may arise at a lower probability due to clogging or bubbles. Thus, the defective discharge detection frequency is set to $0.5\times10^{n}$.

On the other hand, if the number of defective nozzles exceeds the threshold value, the discharge defectiveness tends to increase due to adhesion of dusts or abrasion of heaters. Thus, the present embodiment sets the defective discharge detection frequency so as to cause a stepwise change from $0.5\times10^{n}$ to $0.3\times10^{n}$ and then to $0.1\times10^{n}$ according to an increase in the cumulative number of discharges.

Thus, the present embodiment can perform the defective discharge detection processing at the optimum interval even in a situation where the number of defective nozzles increases due to dusts or the like or abrasion of heaters.

Furthermore, the present embodiment can improve the reliability of the recording apparatus and can effectively reduce the processing time.

The present embodiment is not limited to the above-described control that sets only one threshold value and starts counting the cumulative number of discharges based on the threshold value. If needed, two or more threshold values can be set so as to control the defective discharge detection according to the cumulative number of discharges in each range.

In short, the present embodiment can appropriately set an optimum threshold value so that the defective discharge detection can be performed with an optimum interval corresponding to the generation rate of discharge defectiveness.

The present embodiment is not limited to the above-described control that uses only one parameter (e.g., cumulative number of discharges) as a parameter relating to the cumulative recording amount. For example, the operation frequency of the defective discharge detection processing can be changed based on two or more parameters (e.g., a cumulative number of discharges and a cumulative operation time).

Furthermore, the recovery processing (including a suction recovery operation and a preliminary discharge operation) can recover the discharge state of ink in a defective nozzle. Therefore, executing the recovery processing before detecting the discharge state of ink is useful to accurately detect the discharge state of ink.

Software program code for realizing the functions of the above-described exemplary embodiments can be supplied to a system or an apparatus connected to various devices. A computer (or CPU or micro-processing unit (MPU)) in the system or the apparatus can execute the program to operate the devices to realize the functions of the above-described exemplary embodiments.

Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions.

Furthermore, the present invention encompasses supplying the program code to a computer with a storage (or recording) medium storing the program code. In this case, the type of program can be any one of object code, interpreter program, and OS script data.

A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R)

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Namely, the present invention encompasses WWW servers that allow numerous users to download the program files so that the functions or processes of the present invention can be realized on their computers.

Moreover, an operating system (OS) or other application software running on the computer can execute part or all of the actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

The present invention can be applied to a system including a plurality of devices or can be applied to a single apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-094558 filed Mar. 30, 2006, and No. 2007-053055 filed Mar. 2, 2007 which are hereby incorporated by reference herein in their entirety.

What is claimed is:

1. A recording apparatus, comprising:

a recording head configured to discharge ink to record an image;

a detection unit including a light-emitting element that emits light and a light-receiving element that receives the light emitted by the light-emitting element, wherein the detection unit is configured to detect a discharge state of the ink of the recording head by detecting whether the ink discharged from the recording head blocks the light emitted by the light-emitting element at the light-receiving element;

a counting unit configured to count a discharge number of ink discharged from the recording head after the detection unit performs a previous detection operation; and a control unit configured to, in a case where it is determined that a discharge number counted by the counting unit is larger than a threshold dot count value, cause the detection unit to perform a next detection operation, and change the threshold dot count value according to a total number of ink discharges from the recording head.

2. The recording apparatus according to claim 1, wherein the recording head includes at least one nozzle array, and the control unit causes the detection unit to detect the discharge state of the ink for each nozzle array and determines the threshold dot count value from the previous detection operation to the next detection operation based on the total number of ink discharges of each nozzle array.

3. The recording apparatus according to claim 1, wherein the control unit sets a smaller threshold dot count value to detect the discharge state of the ink when the total number of ink discharges increases.

4. The recording apparatus according to claim 1, wherein the detection unit, based on the discharge state of the ink, detects that a discharge port on the recording head is defective, the recording apparatus further comprising[:] a recording control unit configured to perform a recording operation without using a defective discharge port detected by the detection unit.

5. The recording apparatus according to claim 1, further comprising[:] a recovery unit configured to maintain a discharge state of the recording head, wherein the control unit controls the recovery unit to execute a recovery operation for the recording head before the detection unit detects the discharge state of ink.

6. The recording apparatus according to claim 1, wherein the control unit sets a threshold dot count value to detect the discharge state of the ink based on a result detected by the detection unit and the total number of ink discharges.

7. The recording apparatus according to claim 1, wherein the detection unit detects a number of defective nozzles and, after the number of detected defective nozzles exceeds a predetermined number, the counting unit starts to count the total number of ink discharges from the recording head.

*8. A recording apparatus comprising:*

*a recording head configured to discharge ink;*

*a counting unit configured to count a cumulative recording amount;*

*a detection unit configured to perform a detecting operation of detecting a discharge state of the ink discharged from the recording head; and*

*a control unit configured to cause the detection unit to perform the detecting operation, wherein, based on the cumulative recording amount, the control unit changes a frequency of causing the detection unit to perform the detecting operation of detecting the discharge state of the ink discharged from the recording head.*

*9. The recording apparatus according to claim 8,*

*wherein, in a case where the cumulative recording amount is smaller than a predetermined amount, the control unit causes the detection unit to perform the detecting operation at a frequency lower than that in a case where the cumulative recording amount is equal to or larger than the predetermined amount.*

*10. The recording apparatus according to claim 8,*

*wherein the control unit causes the detection unit to perform a next detecting operation based on a number of discharges performed by the recording head after a previous detecting operation.*

*11. The recording apparatus according to claim 10, wherein,*

*in a case where the cumulative recording amount is smaller than a predetermined amount, the control unit causes the detection unit to perform the next detecting operation when the number of the discharges performed by the recording head after the previous detecting operation becomes equal to or larger than a first threshold value and,*

*in a case where the cumulative recording amount is equal to or larger than the predetermined amount, the control unit causes the detection unit to perform the next detecting operation when the number of the discharges performed by the recording head after the previous detecting operation becomes equal to or larger than a second threshold value which is smaller than the first threshold value.*

*12. The recording apparatus according to claim 8,*

*wherein the cumulative recording amount is a cumulative discharge number of discharges performed by the recording head.*

*13. The recording apparatus according to claim 12,*

*wherein the counting unit counts the cumulative discharge number based on a number of ink droplets discharged from the recording head.*

*14. The recording apparatus according to claim 12,*

*wherein the counting unit counts the cumulative discharge number based on an amount of ink discharged from the recording head.*

*15. The recording apparatus according to claim 12,*

*wherein the counting unit counts the cumulative discharge number based on a recording information signal used for causing the recording head to discharge ink.*

*16. The recording apparatus according to claim 12,*

*wherein the recording head includes a plurality of discharging port arrays, and*

*wherein the counting unit counts the cumulative discharge number for each of the plurality of discharge port arrays.*

*17. The recording apparatus according to claim 16,*

*wherein the control unit causes the detection unit to perform the detecting operation based on each of the cumulative discharge numbers counted for a different one of the discharge port arrays.*

*18. The recording apparatus according to claim 8,*

*wherein the cumulative recording amount is a cumulative number of recording sheets on which the recording has been performed by the recording head.*

*19. The recording apparatus according to claim 8, further comprising a recovery unit configured to recover the recording head,*

*wherein, in a case where any defective discharge port has been detected by the detection unit, the recording apparatus causes the recovery unit to perform a recovery operation of recovering the recording head.*

*20. The recording apparatus according to claim 8,*

*wherein, in a case where any defective discharge port has been detected by the detection unit, the recording apparatus performs a recording operation using a normal discharge port instead of the detected defective discharge port.*

*21. The recording apparatus according to claim 8,*

*wherein the detection unit includes a light-emitting element that emits light and a light-receiving element that receives the light emitted by the light-emitting element.*

*22. A recording apparatus comprising:*

*a recording head configured to discharge ink;*

*a counting unit configured to count a cumulative recording amount;*

*a detection unit configured to detect a discharge state of the ink discharged from the recording head; and*

*a setting unit configured to set, based on the cumulative recording amount, a detection interval at which the detection unit detects the discharge state of the ink discharged from the recording head.*

*23. The recording apparatus according to claim 22,*

*wherein, in a case where the cumulative recording amount is smaller than a predetermined amount, the setting unit sets the detection interval in a manner such that the detection interval is longer than the detection interval in a case where the cumulative recording amount is equal to or larger than the predetermined amount.*

*24. The recording apparatus according to claim 22,*

*wherein the detection unit performs a next detecting operation based on a number of discharges performed by the recording head after a previous detecting operation.*

*25. The recording apparatus according to claim 24, wherein,*

*in a case where the cumulative recording amount is smaller than a predetermined amount, the detection unit performs the next detecting operation when the number of the discharges performed by the recording head after the previous detecting operation becomes equal to or larger than a first threshold value and,*

*in a case where the cumulative recording amount is equal to or larger than the predetermined amount, the detection unit performs the next detecting operation when the number of the discharges performed by the recording head after the previous detecting operation becomes equal to or larger than a second threshold value which is smaller than the first threshold value.*

*26. The recording apparatus according to claim 22,*

*wherein the cumulative recording amount is a cumulative discharge number of discharges performed by the recording head.*

*27. The recording apparatus according to claim 26,*

*wherein the counting unit counts the cumulative discharge number based on a number of ink droplets discharged from the recording head.*

*28. The recording apparatus according to claim 26,*

*wherein the counting unit counts the cumulative discharge number based on an amount of ink discharged from the recording head.*

*29. The recording apparatus according to claim 26,*

*wherein the counting unit counts the cumulative discharge number based on a recording information signal used for causing the recording head to discharge ink.*

*30. The recording apparatus according to claim 26,*

*wherein the recording head includes a plurality of discharging port arrays, and*

*wherein the counting unit counts the cumulative discharge number for each of the plurality of discharge port arrays.*

*31. The recording apparatus according to claim 30,*

*wherein the control unit causes the detection unit to perform a detecting operation based on each of the cumulative discharge numbers counted for a different one of the discharge port arrays.*

*32. The recording apparatus according to claim 22,*

*wherein the cumulative recording amount is a cumulative number of recording sheets on which the recording has been performed by the recording head.*

*33. The recording apparatus according to claim 22, further comprising a recovery unit configured to recover the recording head,*

*wherein the recording apparatus causes the recovery unit to perform a recovery operation of recovering the recording head in a case where any defective discharge port has been detected by the detection unit.*

*34. The recording apparatus according to claim 22,*

*wherein, in a case where any defective discharge port has been detected by the detection unit, the recording apparatus performs a recording operation using a normal discharge port instead of the detected defective discharge port.*

*35. The recording apparatus according to claim 22,*

*wherein the detection unit includes a light-emitting element that emits light and a light-receiving element that receives the light emitted by the light-emitting element.*

*36. The recording apparatus according to claim 8, wherein the cumulative recording amount is based on one of a cumulative number of discharges of the recording apparatus, a cumulative recording area, a cumulative recording sheet number, a cumulative scanning number, a cumulative discharge amount of the recording apparatus, a cumulative operation time of the recording apparatus, and an operation time of the recording head.*

*37. The recording apparatus according to claim 8, wherein the cumulative recording amount represents recording of images.*

*38. The recording apparatus according to claim 22, wherein the cumulative recording amount is based on one of a cumulative number of discharges of the recording apparatus, a cumulative recording area, a cumulative recording sheet number, a cumulative scanning number, a cumulative discharge amount of the recording apparatus, a cumulative operation time of the recording apparatus, and an operation time of the recording head.*

*39. The recording apparatus according to claim 22, wherein the cumulative recording amount represents recording of images.*

*40. A method for a recording apparatus, the method comprising:*

*discharging ink from a recording head;*

*counting a cumulative recording amount;*

*performing, via a detection unit, a detecting operation of detecting a discharge state of the ink discharged from the recording head; and*

*causing the detection unit to perform the detecting operation, wherein, based on the cumulative recording amount, causing includes changing a frequency of causing the detection unit to perform the detecting operation.*

*41. A method for a recording apparatus, the method comprising:*

*discharging ink from a recording head;*

*counting a cumulative recording amount;*

*detecting, via a detection unit, a discharge state of the ink discharged from the recording head; and*

*setting, based on the cumulative recording amount, a detection interval at which the detection unit detects the discharge state.*

*42. A non-transitory storage medium storing a program to cause a recording apparatus to perform a method, the method comprising:*

*discharging ink from a recording head;*

*counting a cumulative recording amount;*

*performing, via a detection unit, a detecting operation of detecting a discharge state of the ink discharged from the recording head; and*

*causing the detection unit to perform the detecting operation, wherein, based on the cumulative recording amount, causing includes changing a frequency of causing the detection unit to perform the detecting operation.*

*43. A non-transitory storage medium storing a program to cause a recording apparatus to perform a method, the method comprising:*

*discharging ink from a recording head;*

*counting a cumulative recording amount;*

*detecting, via a detection unit, a discharge state of the ink discharged from the recording head; and*

*setting, based on the cumulative recording amount, a detection interval at which the detection unit detects the discharge state.*

* * * * *